United States Patent Office 3,069,477
Patented Dec. 18, 1962

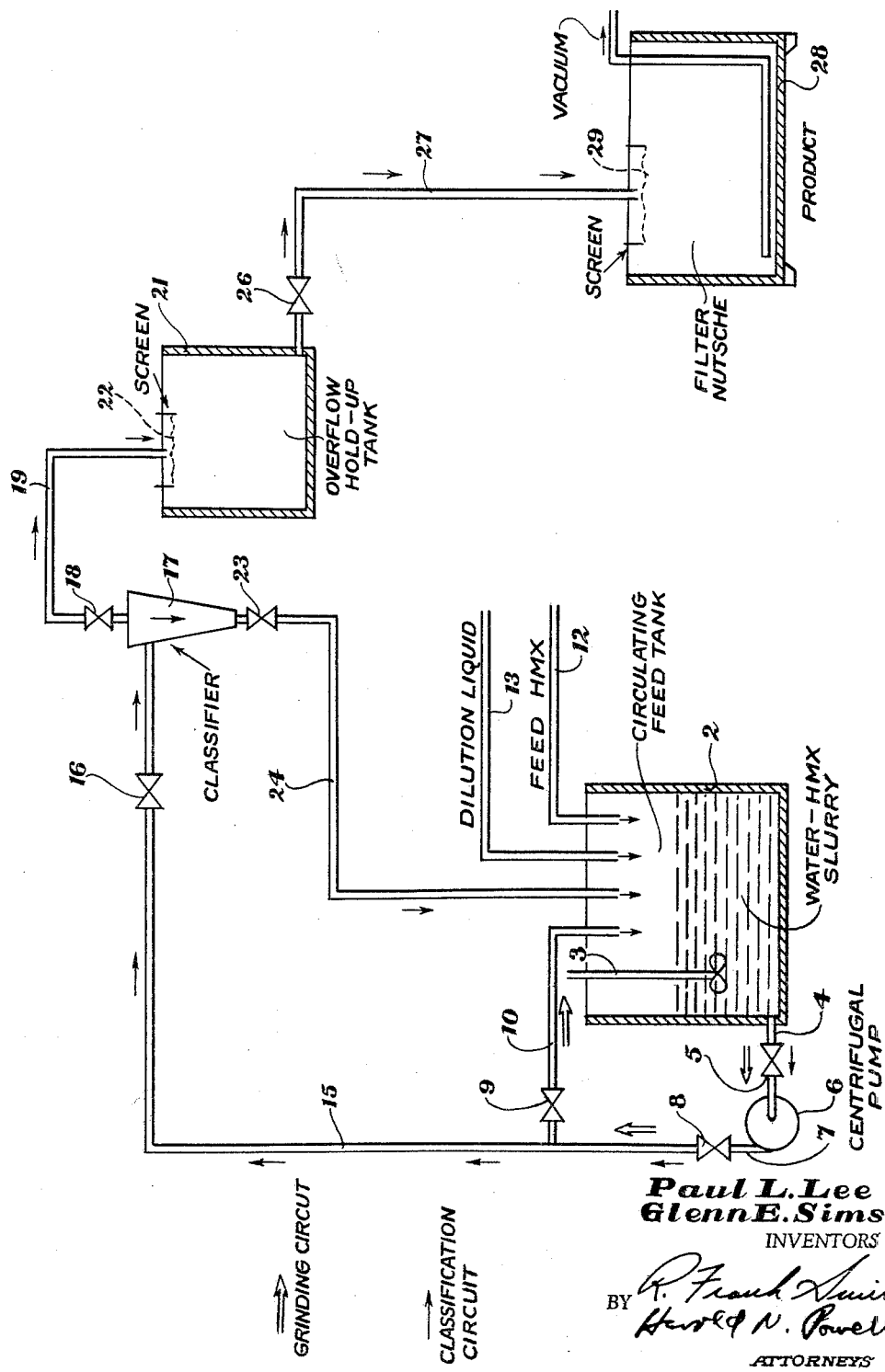

3,069,477
PREPARATION OF FINE HMX
Paul L. Lee and Glenn E. Sims, Kingsport, Tenn., assignors to Eastman Kodak Company, Rochester, N.Y., a corporation of New Jersey
Filed Feb. 29, 1960, Ser. No. 11,891
8 Claims. (Cl. 260—644)

This invention relates to the production of HMX in a certain form and purity. More particularly this invention concerns the production of HMX in the form of crystals or particles at least a part of which are less than 325 mesh and of a relatively high purity.

HMX is a known explosive material described in various publications such as "Journal of the American Chemical Society," vol. 73, 1951, pages 2769–2773. Page 2772 of said publication refers to the HMX in the form of large and colorless bipyramid crystals. This explosive product may also be known as 1,3,5,7-tetranitro-1,3,5,7-tetrazacyclooctane. However, for convenience of description herein the simpler term HMX will be used.

In the industry there has developed a demand for HMX in the form of fine particles and of the beta-polymorphic modification. As is known, HMX may exist in several polymorphic forms such as the alpha, beta, gamma and delta. The beta form is preferred because of its lower sensitivity, it being apparent from such sensitivity characteristics that such beta form is more adaptable to certain utilization.

It is therefore believed apparent that the development of procedures for obtaining fine HMX as aforementioned of relatively good purity represents a highly desirable result. After extensive investigation, we have found a process whereby crude HMX may be converted to a fine HMX of excellent purity and that such production may be accomplished on a sizable scale.

This invention has for one object to provide a process of converting crude or as prepared HMX compositions to an HMX of a finer particle size and of an improved purity. Another object is to provide a process of the class indicated which involves cyclonic separation and classification. A further object is to provide a new product consisting substantially entirely of $\beta$-HMX of a size not greater than about 325 mesh and of a purity of the order of at least 97%. Other objects will appear hereinafter.

In the broader aspects of our invention we have found that HMX as produced and in a somewhat crude form comprised largely of coarse crystals may be converted to the desired fine product. We have found that if the crude HMX is suitably diluted, the resultant slurry may be recirculated in a certain manner by passage through pumps and throttling valves for a sufficient period so that relatively fine sized particles would be obtained as well as apparent conversion to the $\beta$-polymorphic modification. By certain procedures and controls of the dilution, undesired components which may be present, as RDX, are reduced or eliminated by our process. After the reduction of the particle size as aforesaid, the liquid containing the desired fine HMX is further diluted and subjected to cyclonic separation as will be described in detail hereinafter. By such procedure the desired fine HMX will be readily isolated upwardly from the cyclone center and conducted to suitable hold-up tanks. The down flow from the cyclonic separation will contain any coarse HMX which will be returned to the first part of the process.

The liquid containing the fine HMX thus isolated in our process may then be separated from the liquid environment and passed to vacuum filtration and other steps to give the final product which may be packaged or otherwise handled or utilized.

For a further understanding of our invention reference is made to the attached drawing forming a part of this application. The attached drawing comprises a semidiagrammatic side elevation view of an apparatus arrangement which may be used for carrying out our process and the drawing is somewhat in the nature of a flow sheet.

Referring to the drawing, there is provided a large circulating type tank 2. While it is preferred to construct this tank from stainless steel or the like type of metal material, the tank may be constructed from other materials such as aluminum, glass, or glass-lined metal. The tank may be of any desired capacity depending on the quantities of product that it is desired to process. However, we have found that a tank of approximately 1100 gallons size is quite useful for carrying out the present process and for obtaining good circulation and temperature control. In a similar manner, the various pipes and valves to be referred to hereinafter may be constructed of materials such as aluminum and other nonferrous metals, stainless steel, plastics such as polyvinyl chloride, and cellulose ester material such as that sold under the trademark Tenite Acetate and Tenite Butyrate.

In general we would have one or more agitator devices 3 positioned within the tank. On the larger tanks, several such type agitators may be desirable. Since such type agitators are standard items, extended description is unnecessary.

The lower part of the tank is provided with the withdrawal conduit 4 which leads through valve 5 to a centrifugal pump 6. The pump is connected by conduit 7 through valves 8, 9 and conduit 10 in a manner that the contents of the tank may be withdrawn from the bottom thereof and pumped back into the top of the tank.

Tank 2 is also provided with inlet conduits 12 and 13. These conduits are for the purpose of introducing into the tank the feed HMX which it is desired to convert to the HMX fines and to provide for the introduction of the diluent liquid. The diluent liquid is usually and preferably water. However, in some instances a certain amount of organic solvent exemplified by acetone, alcohol and the like may be introduced.

We have found that for example if the crude HMX contans a certain amount of RDX component, this may be eliminated or reduced by introducing through conduit 13 warm or hot water. Since the RDX is soluble therein, this component is taken up by the water thereby accomplishing a separation from the HMX and thereby assisting in the production of the HMX fines of a purity of the order of 97%.

Pump 6 is also connected by means of conduit 15 through valve 16 to the cyclone separator and classifier 17. While this cyclone separator may be of a commercially obtainable construction, we have found for the purposes of the present invention that such units should contain certain features of construction. In further detail, the preferred cyclone separator would be 6 inches or less in diameter equipped with four vortex finders and five apex valves. We have found for obtaining the best results in producing the desired fines at a practical production rate for the present invention that a nominal 6 inch diameter cyclone equipped with a 1 in. apex valve and a 1¼ in. vortex finder are preferably used in the cyclone classification.

The upper part of the cyclone classifier is connected through valve 18 and conduit 19 to the overflow hold-up tank 21. The discharge from conduit 19 preferably is passed through a classifying screen 22. The lower outlet portion of separator 17 is connected through valve 23 and conduit 24 so as to discharge back into feed tank 2.

The hold-up tank 21 just mentioned may be constructed of any of the metal materials referred to above and be of any desired size. We have found that a size of the order of 4400 gallons is satisfactory. In place of a single tank, two or more tanks may be employed.

The tank 21 is connected through valve 26 and conduit 27 to a vacuum filter 28. Since such vacuum filter is a known commercial item, description of the construction thereof appears to be unnecessary. Preferably the discharge from conduit 27 into this vacuum filter will be passed through a suitable screen 29.

An understanding of the operation of the above described apparatus is apparent to a substantial extent from the preceding description. However, the operation will be clear from the following example which represents our preferred embodiment for carrying out our process.

*Example*

In this example the feed HMX was of about a 95% initial purity. This feed HMX which it was desired to convert to HMX fines was processed by the following steps:

A. The HMX was charged into tank 2. The amount charged preferably is within the limits of 2,500–3,000 pounds.

B. Water was added to tank 2 until the level raised a few inches then start and stop agitator until it turns freely. With agitator running, continue to add water until the agitator impeller and hub are completely covered.

C. At this point, the slurry should be agitating and circulating good throughout the tank. If not, add water until circulation is good.

D. Open tank outlet valve 5, pump discharge valve 8 and valve 9 on slurry header above top of tank 2.

E. Start tank slurry centrifugal pump and throttle pump discharge valve 8 by closing it about several turns, or until slurry returning to the tank appears to have little or no force behind it. This will hold the slurry in the pump head and allow the impeller to mildly break down the crystals.

F. With the pump and agitator running, pump and grind the diluted crude HMX for about 16 hours, preferably without stopping the pump or agitator.

G. While the slurry is circulating and grinding, the slurry temperature will gradually increase to 50–60° C. As it heats up, introduce cool water into the tank every 15–20 minutes such as by washing down the sides of the tank. If the slurry becomes thick and does not agitate good throughout the tank, add more water to the tank until it does so. In general the tank is kept closed when not adding water or washing down tank.

H. After grinding for approximately 16 hours, add further water to tank 2.

I. Open valve 16 in slurry line above pump leading to the cyclone separator 17. This will allow the slurry to flow to the cyclone separator where the HMX fines overflow from the top into tank 21 and the coarse underflow flows back from the bottom of the separator to the feed tank 2.

J. As the fines overflow into the collection tank 21, the grist size can be reasonably checked by using an 8″ diameter, 200 mesh laboratory screen. As long as the slurry either passes on through the screen freely or can be washed through with a small stream of water, it can be assumed that the HMX will have the desired fine size of below 325 mesh (U.S.S.).

K. Whenever the HMX piles up on the 200 mesh screen and will not wash through, or the level in tank 2 gets to the point where the pump stops pumping, close valve 16 on circulating line leading to separator and valve 18 on overflow line.

(1) If the material left in tank 2 appears coarse and there is over 500–600 pounds, repeat the grinding step as described above and then again feed the cyclone separator as described above.

(2) If the material left in tank 2 only amounts to 200–300 pounds, leave it in tank for repeated operation, with a further supply of crude HMX feed.

L. Allow the material in tank 21 to settle overnight or longer.

M. After settling, if liquid is clear in tank 21, decant the water out of the tank down to within 6–8 inches of the HMX cake on the bottom of the tank.

N. Agitate contents of tank 21 for about 15 minutes.

O. Drop slurry into nutsches 28 through a 60 mesh screen 29. It is desirable to make sure that the nutsches are clean and that probe socks are in good condition with no holes.

P. Put vacuum on nutsches 28 and dewater. Usually pulling vacuum continuously for 24–36 hours will lower the moisture content of the nutsches to approximately 30%.

Q. Sample the product for analysis and if sufficiently dry and otherwise satisfactory it may be packaged by bagging or conveyed into drums.

Tests of the product produced by the foregoing example showed that the HMX particles were of the desired size of less than 325 mesh (U.S.S.). Also, the purity was in excess of 97% and the product predominantly the $\beta$-polymorphic modification. The product from the vacuum filter was such that it may be readily packaged by either bagging or conveying into drums.

While in the above example the circulating and grinding treatment were carried out for approximately 16 hours with respect to the particular quantity of coarse crystals fed into the tank 2, such types of processing may be varied somewhat. That is, with smaller quantities, shorter times of operations will suffice as also in the case when the crystals of the crude are not unduly large. However, in general we prefer to employ a time of treatment within the range of 4 hours to 24 hours. The degree of the dilution of the feed HMX may be varied somewhat. In general, however, we prefer that the feed HMX be diluted to a slurry of about 40–60% solids. After the pumping recirculation action for several hours and before the slurry containing the fines is conducted to the cyclone separation, we would prefer that the dilution be carried out to an extent that the slurry has approximately 15% solids. As described above, certain of this further dilution may be accomplished in the tank for temperature control purposes and the remainder accomplished just prior to the conducting of the slurry to the cyclone separator.

Although we have described the removal of the supernatant aqueous media by decantation, as this is a relatively simple economical procedure, it is apparent that other suitable ways of separating the water may be employed such as by siphoning, centrifuging and the like.

The invention has been described in detail with particular reference to preferred embodiments thereof, but it will be understood that variations and modifications can be effected within the spirit and scope of the invention as described hereinabove and as defined in the appended claims.

We claim:

1. The process of producing 1,3,5,7-tetranitro-1,3,5,7-tetrazacyclooctane fines of a size not greater than 325 mesh and a purity in excess of 90% which comprises diluting a supply of coarse 1,3,5,7-tetranitro-1,3,5,7-tetrazacyclooctane with an aqueous diluent until a pumpable slurry is obtained, subjecting said pumpable slurry to a pumping recirculation of a period of from about 4 to about 24 hours of sufficient intensity for the coarse crystals to be broken down to a small size, further diluting the aforementioned slurry and passing it through a cyclonic separator wherein the desired fines are separated in slurry form from the coarser particles, conducting said fines thus isolated to further treatment wherein the aqueous medium is separated from the fines and the fines are isolated and dried.

2. A process for the production of finely divided high-purity 1,3,5,7-tetranitro-1,3,5,7-tetrazacyclooctane which which comprises charging at least about one ton of coarse 1,3,5,7-tetranitro - 1,3,5,7 - tetrazacyclooctane of about 95% purity into a slurry tank, adding water to said tank with agitation until a pumpable slurry is obtained, starting and throttling a centrifugal pump connected to said slurry tank and recirculating said pumpable slurry to said slurry tank until little or no force remains behind the slurry undergoing recirculation, thereby holding the slurry in the pump head and allowing the continued agitation to break down the coarse 1,3,5,7-tetranitro-1,3,5,7-tetrazacyclooctane, resuming the recirculation with agitation and continuing same for about 16 hours while adding cool water to said slurry tank at intervals of about 15 to 20 minutes, adding further water, conducting a portion of the slurry to a cyclonic separator, overflowing 1,3,5,7-tetranitro-1,3,5,7-tetrazacyclooctane fines from the top of said cyclone separator, underflowing any remaining coarse 1,3,5,7-tetranitro-1,3,5,7-tetrazacyclooctane from the bottom of said cyclone separator and returning same to the slurry tank, allowing the fines overflowing from said cyclonic separator to settle in a separation tank, decanting the water from said tank, thereby leaving a cake of 1,3,5,7-tetranitro-1,3,5,7-tetrazacyclooctane in the bottom of said tank, vacuum drying said cake to substantially dry beta-polymorphic form of 1,3,5,7-tetranitro-1,3,5,7-tetrazacyclooctane product of a purity of at least 97% and a size of not greater than 325 mesh, and packaging said product.

3. A process for the production of finely divided, high-purity 1,3,5,7-tetranitro-1,3,5,7-tetrazacyclooctane which comprises suspending crude coarse 1,3,5,7-tetranitro-1,3, 5,7-tetrazacyclooctane particles in a fluid solvent, thereby forming a slurry of said particles, subjecting said slurry to turbulent flow conditions, thereby gradually splitting and fracturing said particles in the absence of mechanical comminution by repeated impact and collision among themselves, subjecting said slurry after said fracturing of said particles to cyclonic separation, thereby separating any remaining coarse particles from the fractured particles, and collecting and drying the separated fractured particles in substantially pure β-polymorphic form.

4. A process for the production of finely divided, high-purity 1,3,5,7-tetranitro-1,3,5,7-tetrazacyclooctane which comprises diluting crude 1,3,5,7-tetranitro-1,3,5,7-tetrazacyclooctane with water to the consistency of a pumpable slurry, recirculating said slurry by pumping for a sufficient length of time for substantially complete conversion to finely divided, substantially pure β-polymorphic form, further diluting the slurry, subjecting same to cyclonic separation whereby said finely divided, substantially pure β-polymorphic form of 1,3,5,7-tetranitro-1,3,5,7-tetrazacyclooctane is separated in a liquid environment from any remaining coarse 1,3,5,7-tetranitro-1,3,5,7-tetrazacyclooctane, separating said finely divided, substantially pure β-polymorphic form of 1,3,5,7-tetranitro-1,3, 5,7-tetrazacyclooctane from said liquid environment, and collecting same as a dry product.

5. A process in accordance with claim 4 wherein the coarse 1,3,5,7-tetranitro-1,3,5,7-tetrazacyclooctane from the cyclonic separation is returned to the original pumpable slurry.

6. A process in accordance with claim 4 wherein the crude 1,3,5,7-tetranitro-1,3,5,7-tetrazacyclooctane is of the order of about 95% purity and in the quantity of at least one ton and the recirculation of the slurry by pumping is carried out for at least 16 hours whereby a product of at least 97% purity and a mesh size of less than 325 is obtained.

7. A process in accordance with claim 4 wherein the water used in diluting the 1,3,5,7-tetranitro-1,3,5,7-tetrazacyclooctane is sufficiently warm to dissolve substantially all of the impurities and purify the 1,3,5,7-tetranitro-1,3,5,7-tetrazacyclooctane.

8. In a process for producing 1,3,5,7-tetranitro-1,3,5,7-tetrazacyclooctane, the improvement which comprises converting the coarse 1,3,5,7-tetranitro-1,3,5,7-tetrazacyclooctane to a finely divided, substantially pure β-polymorphic form by recirculating diluted coarse 1,3,5,7-tetranitro-1,3,5,7-tetrazacyclooctane as a pumpable slurry for a period of at least about 16 hours, passing the further diluted slurry through a cyclonic separator wherein the finely divided, substantially pure β-polymorphic 1,3,5,7-tetranitro-1,3,5,7-tetrazacyclooctane is separated as a slurry from any remaining coarse 1,3,5,7-tetranitro-1,3,5, 7-tetrazacyclooctane, and isolating the finely divided, substantially pure β-polymorphic 1,3,5,7-tetranitro-1,3,5,7-tetrazacyclooctane as a dry product.

References Cited in the file of this patent
UNITED STATES PATENTS

| | | |
|---|---|---|
| 1,367,895 | Schouten | Feb. 8, 1921 |
| 2,622,277 | Bonell et al. | Dec. 23, 1952 |
| 2,678,927 | Wright et al. | May 18, 1954 |